Figure 1:
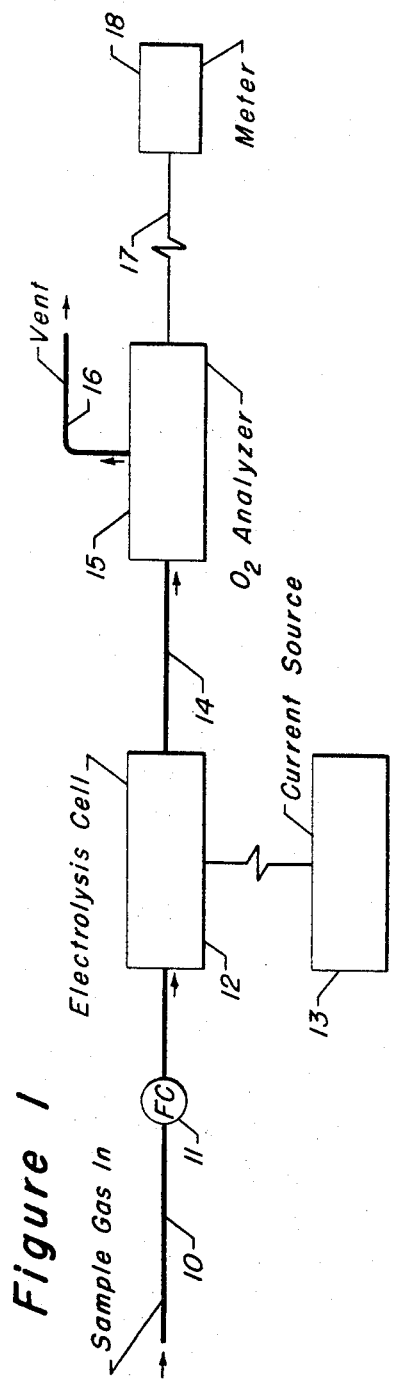

Oct. 22, 1968  L. F. PASIK  3,407,124
METHOD OF ANALYZING TRACE WATER
Filed Oct. 30, 1964

INVENTOR:
Leonard F. Pasik

BY:
ATTORNEYS

United States Patent Office 3,407,124
Patented Oct. 22, 1968

3,407,124
METHOD OF ANALYZING TRACE WATER
Leonard F. Pasik, Mount Prospect, Ill., assignor to Universal Oil Products Company, Des Plaines, Ill., a corporation of Delaware
Filed Oct. 30, 1964, Ser. No. 407,691
5 Claims. (Cl. 204—1)

This invention relates to a method for determining the water content of a gas stream. More particularly, the invention is directed to the continuous analysis for water of a gas stream containing low concentrations of water vapor, typically in the range of 1–100 weight parts per million. The present method is especially adapted for determining the concentration of water in a gaseous mixture stream comprising hydrogen and light hydrocarbons.

Continuous process stream analyzers for measuring the moisture content of industrial process streams find wide application. The many commercially available instruments utilize various physical or chemical mechanisms for their operation and include, for example, recording psychrometers, direct-recording psychrometers, dimensional-change hygrometers, electrical-resistance hygrometers, mirror-type dew point recorders, and adsorption-desorption type water vapor analyzers. When determining very low concentrations of water in a gas sample, the electrolytic water analyzer has been generally accepted for continuous monitoring applications. In this instrument, water vapor in a gas stream is continually passed over and absorbed by a film of partially hydrated phosphorus pentoxide or phosphoric acid. The absorbed water is quantitatively electrolyzed between platinum electrodes in a detector cell. The current required for electrolysis is directly proportional to the absorbed water, therefore a measure of the electrolysis current at a given sample flow rate provides a measure of the water content of the sample gas stream. This method can be adapted to determining the moisture content of liquids by stripping water from the liquid sample with a dry gas and passing the stripper effluent, comprising water vapor and stripping gas, to the absorptive type electrolysis cell.

Notwithstanding its inherently high sensitivity, the electrolytic water analyzer has the disadvantage of frequent baseline drift or zero shift. This arises from the fact that the cell resistance, and therefore the resistive current, gradually changes, particularly when the sample gas contains hydrogen and/or light hydrocarbons, because of absorptive or electrochemical effects, involving the hydrogen or light hydrocarbons, on the hygroscopic material and the electrodes. Since the output meter is responsive to total current and cannot distinguish between resistive current and electrolysis current, a baseline shift results. The magnitude of the baseline shift due to hydrogen or hydrocarbon interference can be quite substantial, amounting to several times the true water content of the sample when it is less than 10 p.p.m. The only practical solution is frequent calibration by experienced personnel, which is time consuming, expensive, and detracting from the principal advantages of a process stream analyzer over classical laboratory analytical techniques.

The present invention is directed to a technique which retains the high sensitivity of the electrolytic water analyzer but eliminates the problem of zero shift. In accordance therewith the sample gas stream comprising water is passed through an electrolysis cell and the water is quantitatively electrolyzed to hydrogen and oxygen, without regard to the magnitude of the electric current required to effect such electrolysis. The cell effluent is then passed to an oxygen analyzer. The oxygen content of the effluent provides a continuous measure of the water content of the sample stream.

When the sample gas stream also contains oxygen as an original constituent which would introduce error, this can be compensated for by a second oxygen analyzer. The sample gas stream is divided into first and second streams. The first stream is passed to an electrolysis cell and the water so introduced is quantitatively electrolyzed to hydrogen and oxygen, effluent gas is removed from the cell and passed to an oxygen analyzer. The second stream is passed to a second oxygen analyzer and the output signals of both analyzers are compared. The increase in oxygen content of electrolysis cell effluent gas over the oxygen content of the second stream provides a measure of the water content of the sample stream.

Figure 2:
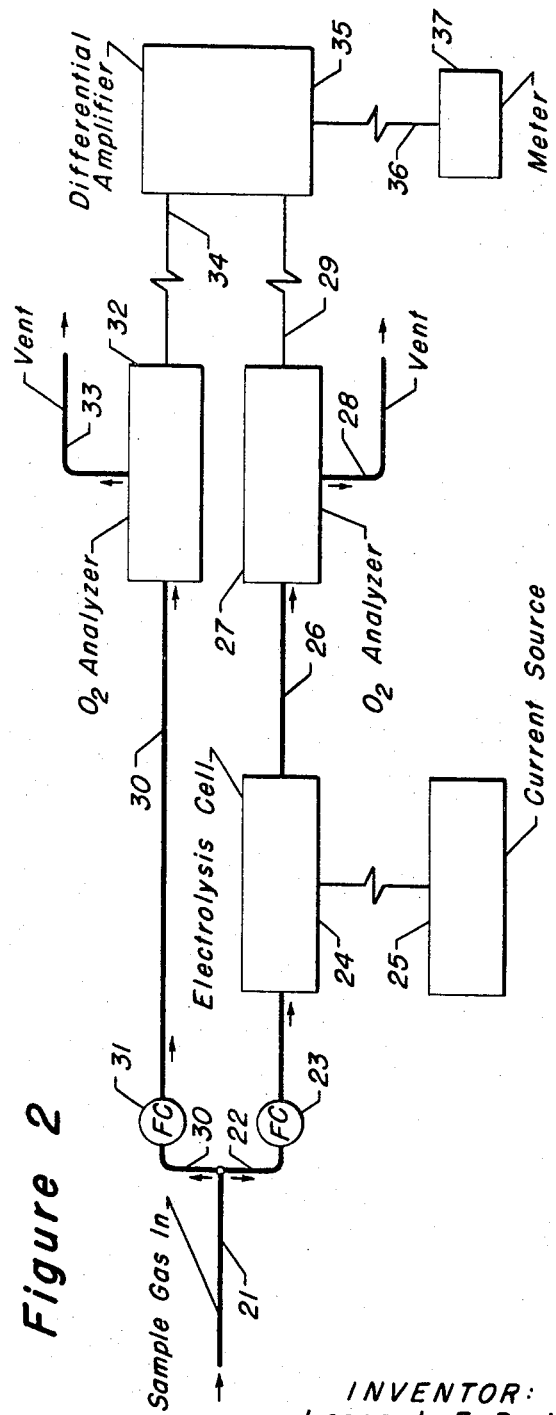

The practice of the invention is further illustrated in connection with the accompanying drawing, in which FIGURE 1 is a flow diagram of an apparatus suitable for an oxygen-free sample stream; and FIGURE 2 is a flow diagram of an apparatus suitable for an oxygen-containing sample stream.

With reference to FIGURE 1, sample gas containing water vapor is introduced through line 10 at a controlled rate of flow by means of flow controller 11 and is passed to electrolysis cell 12. Cell 12 is an electrolytic hygrometer containing a hygroscopic absorbent, such as $P_2O_5$ or phosphoric acid, disposed between platinum electrodes. The water is absorbed by the hygroscopic material. A D-C current source 13 provides sufficient current to quantitatively electrolyze the absorbed water to hydrogen and oxygen. In a conventional electrolytic water analyzer, this current is precisely measured to provide a measure of the water content. Here it need not be measured. The effluent gases from cell 12 are directed by line 14 to an oxygen analyzer 15 and are then vented therefrom via line 16. The electrical output signal of analyzer 15 is taken through leads 17 to a meter 18 which may be an indicator or recorder, usually of the potentiometric type. Meter 18 may be calibrated to read directly in weight p.p.m. $H_2O$ or other convenient units. A suitable oxygen analyzer is an electrolytic cell such as a galvanic cell comprising a lead anode and a silver cathode in an alkaline electrolyte. Typical operating specifications for this arrangement are:

Sample flow _____ cc./min. (STP)__ 50–200
Current _____ $\mu$a./p.p.m. $H_2O$__ 6.6–26.4
Output scale _____ p.p.m. $H_2O$__ 0–20

When the stream to be analyzed contains free oxygen, the above apparatus will yield false readings. The embodiment of FIGURE 2 is designed to accommodate sample streams comprising free oxygen as well as water vapor. In FIGURE 2, the incoming gas stream in line 21 is split into two streams in lines 22, 30. The portion in line 22 is passed through a flow controller 23 to an electrolysis cell 24. Sufficient D-C current is provided by a current source 25 to quantitatively electrolyze the water in the sample stream to hydrogen and oxygen. The oxygen-containing effluent is removed from cell 24 via line 26 and passed to an oxygen analyzer 27 and thence vented through line 28. The other portion of the sample gas stream is passed through line 30, flow controller 31 directly to a second oxygen analyzer 32 and thence vented through line 33. The output voltage signals of oxygen analyzers 27, 32 are transmitted via leads 29, 34 respectively to a differential amplifier 35. The differential signal is amplified and transmitted via leads 36 to a suitable output meter 37. The increase in oxygen content of the effluent gas in line 26 as compared with the oxygen content of the gas in line 30 is reflected in the signal transmitted to the output meter 37 and is directly proportional to the water content of the sample stream. The system may be calibrated as to zero and span settings, by appropriately adjusting the bias voltages on the amplifier input grids so that the output is zero when gas of the same water content is passed simultaneously through both oxygen analyzers and by setting the amplifier gain so that sample gas containing a known water content will produce a specified meter reading.

This invention is particularly well adapted to determining water content of a gaseous mixture stream comprising hydrogen and/or light hydrocarbons. Typical applications include the analysis of recycle hydrogen streams of catalytic naphtha reforming units or heavy oil hydrocracking units, such hydrogen streams comprising 50–80 mol percent hydrogen and substantial amounts of $C_1$–$C_4$ hydrocarbons; also in the production of ethylbenzene by the reaction of ethylene with benzene in the presence of a boron trifluoride catalyst, the analysis for water of the ethylene feed, benzene feed and benzene recycle streams to the alkylation zone, where the water content must be carefully limited to avoid deactivation of the catalyst. In such cases, interference by hydrogen or hydrocarbons would cause substantial baseline drift or zero shift which is obviated by the present invention. It will be obvious, of course, that the water analyzer of this invention may be used for process control applications as well as performing indicating or recording functions.

I claim as my invention:

1. A method for analyzing a gas stream for water content which comprises passing a continuous sample stream of said gas containing water vapor to an electrolytic hygrometer, therein quantitatively electrolyzing the water to hydrogen and oxygen, continuously removing from said hygrometer effluent gas containing said oxygen, and electrolytically measuring the oxygen content of the effluent gas as a continuous measure of the water content of the sample stream.

2. Method of claim 1 wherein said gas stream comprises hydrogen.

3. Method of claim 1 wherein said gas stream comprises light hydrocarbons.

4. Method of claim 1 wherein said gas stream is a recycle hydrogen stream of a catalytic hydrotreating process unit.

5. A method of analyzing a gas stream containing oxygen for water content which comprises dividing a sample stream of said gas containing oxygen and water vapor into first and second streams, passing said first stream to an electrolytic hygrometer, therein quantitatively electrolyzing the water so introduced to hydrogen and oxygen, removing from said hygrometer effluent gas comprising electrolytically generated oxygen and originally present oxygen, separately electrolytically measuring the oxygen content of said effluent gas and said second stream, and measuring the increase in oxygen content of the effluent gas over the second stream as a measure of the water content of the sample stream.

References Cited

UNITED STATES PATENTS

| | | | |
|---|---|---|---|
| 2,805,191 | 9/1957 | Hersch | 204—195 |
| 3,006,836 | 10/1961 | Cole | 204—195 |
| 3,086,924 | 4/1963 | Bentley et al. | 204—195 |
| 3,118,735 | 1/1964 | Favre et al. | 23—230 |

FOREIGN PATENTS

| | | |
|---|---|---|
| 707,323 | 4/1954 | Great Britain. |

HOWARD S. WILLIAMS, *Primary Examiner.*

T. TUNG, *Assistant Examiner.*